United States Patent [19]

Kawasaki et al.

[11] Patent Number: 4,939,834
[45] Date of Patent: Jul. 10, 1990

[54] MACHINE TOOL WITH TOOL CHANGE MECHANISM

[75] Inventors: Hisamitsu Kawasaki, Kariya; Kunimichi Nakashima, Anjo; Kazunori Araki, Kariya; Tsuyoshi Mizuno, Toyota, all of Japan

[73] Assignee: Toyoda Koki Kabushiki Kaisha, Kariya, Japan

[21] Appl. No.: 263,862

[22] Filed: Oct. 28, 1988

[30] Foreign Application Priority Data

Oct. 31, 1987 [JP] Japan .................. 62-276745

[51] Int. Cl.⁵ .......................................... B23Q 3/157
[52] U.S. Cl. ............................... 29/568; 409/134; 409/144; 409/234; 279/1 ME
[58] Field of Search ........ 29/568, DIG. 50, DIG. 56, 29/DIG. 104; 74/609; 409/232, 134, 137, 144, 231, 234, 215; 279/1 ME

[56] References Cited

U.S. PATENT DOCUMENTS

| 2,380,648 | 7/1945 | Hite | 279/1 ME |
|---|---|---|---|
| 3,789,472 | 2/1974 | Pegard | 29/DIG. 104 X |
| 4,409,721 | 10/1983 | Tomita et al. | 29/568 |
| 4,674,172 | 6/1987 | Botimer | 29/568 |

FOREIGN PATENT DOCUMENTS

| 237995 | 8/1986 | European Pat. Off. | 409/232 |
|---|---|---|---|
| 249898 | 12/1987 | European Pat. Off. | 29/568 |
| 2555927 | 6/1985 | France | 29/568 |
| 74970 | 6/1977 | Japan | 29/568 |
| 3160 | 1/1981 | Japan | 29/568 |
| 572338 | 9/1977 | U.S.S.R. | 409/232 |

Primary Examiner—Z. R. Bilinsky
Assistant Examiner—R. Schultz
Attorney, Agent, or Firm—Oblon, Spivak, McClelland, Maier & Neustadt

[57] ABSTRACT

A tool change mechanism in a machine tool includes a tool change arm arranged to attach a protection cover member to the forward end of a spindle head for protection of a ring secured to the forward end of a tool spindle in the spindle head and to remove the protection cover member for replacement with a tool holder of large diameter. The tool change arm is further arranged to insert the tool holder into the tool spindle and remove it from the tool spindle, the tool holder having a ring gear secured thereto for meshing engagement with the ring gear of the tool spindle and a protection cover part integrally formed therewith to be coupled with the forward end of the spindle head for protection of the ring gears meshed with each other when the tool holder has been inserted into the tool spindle. The tool change arm has a pair of tool grippers each having a first grip portion for engagement with the protection cover member and a second grip portion for engagement with the tool holder.

4 Claims, 3 Drawing Sheets

MACHINE TOOL WITH TOOL CHANGE MECHANISM

BACKGROUND OF THE INVENTION

1. Field of the Invention

The present invention relates to a machine tool with a tool change function, and more particularly to a machine tool with a tool change mechanism wherein a tool change arm is arranged to remove a protection cover member attached to the forward end of a spindle head for protection of a ring gear secured to the forward end of a tool spindle.

2. Discussion of the Background

In the case that a rotary tool holder of large diameter is supported in place by insertion into a tool receiving tapered bore in a standard tool spindle, the support rigidity of the tool holder becomes insufficient in heavy cutting. For this reason, it is required to couple the tool holder at its large diameter end with the forward end of the tool spindle by means of a gear coupling to thereby enhance the support rigidity of the tool holder. In this case, the gear coupling is composed of a pair of ring gears which are respectively secured to the forward end of the tool spindle and the large diameter end of the tol holder and arranged to be meshed with each other when the tool holder has been inserted into the tool spindle. For the purpose of protecting the ring gears from scraps of metal during operation of the tool spindle, it is desirable that a protection cover part is formed on the large diameter end of the tool holder to contain therein the ring gears and is replaced with a protection cover member removably attached to the spindle head to contain the ring gear on the tool spindle after removal of the tool holder.

SUMMARY OF THE PRESENT INVENTION

It is, therefore, an object of the present invention to provide a machine tool with a tool change mechanism capable of removing the protection cover member from the spindle head by means of a tool change arm prior to insertion of the tool holder into the tool spindle.

Another object of the present invention is to provide a machine tool with a tool change mechanism, having the above-described characteristics, wherein the protection cover part of the tool holder is positioned in place without any error when the tool holder has been supported by insertion into the tool spindle.

According to the present invention, the objects are accomplished by providing a tool change mechanism in a machine tool having a spindle head mounted thereon and a tool spindle rotatably supported within the spindle head for supporting a standard tool holder inserted thereinto. A machine tool with a tool change mechanism includes a tool change arm arranged to attach a protection cover member to a forward end of the spindle head for protection of a ring gear secured to a forward end of the tool spindle and to remove the protection cover member from the spindle head for replacement with a tool holder of large diameter, the tool change arm being further arranged to insert the tool holder of large diameter into the tool spindle and remove it from the tool spindle, the tool holder of larger diameter having a ring gear secured thereto for meshing engagement with the ring gear of the tool spindle and a protection cover part integrally formed therewith to be coupled with the forward end of the spindle head for protection of the ring gears meshed with each other when the tool holder of large diameter has been inserted into the tool spindle. In the tool change mechanism, the tool change arm has a pair of tool grippers each having a first grip portion for engagement with the protection cover member and a second grip portion for engagement with the tool holder of large diameter.

BRIEF DESCRIPTION OF THE DRAWINGS

Additional objects, features and advantages of the present invention will be more readily appreciated from the following detailed description of a preferred embodiment thereof when considered with reference to the accompanying drawings, in which.

DESCRIPTION OF THE PREFERRED EMBODIMENT

Figure 1:
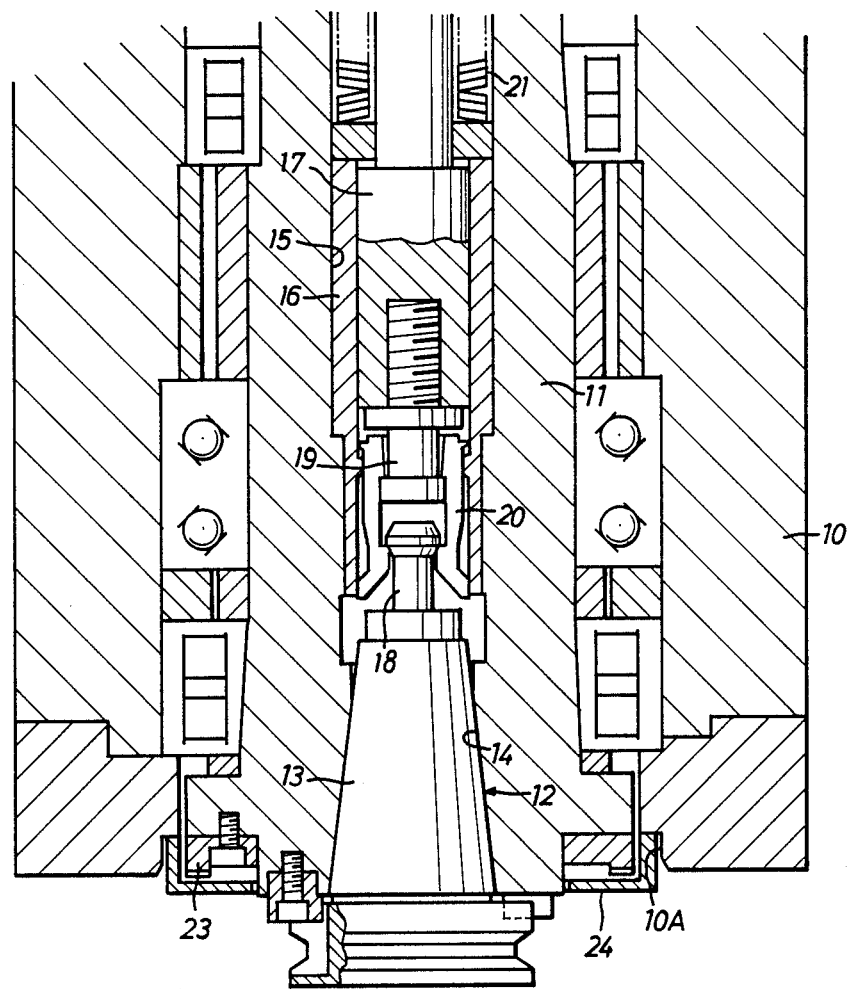
FIG. 1 is a sectional view of a spindle head in a condition where a standard tool holder is supported in place by insertion into a tool spindle.

In FIG. 1 of the drawings, there is illustrated a spindle head 10 of a machine tool (not shown) in which a tool spindle 11 is rotatably supported in a usual manner to rotate a standard tool holder 12 carried thereon. The tool spindle 11 has a tapered bore 14 formed in its forward end for receiving a tapered shank part of tool holder 12 and an axial stepped bore 15 formed in connection with the tapered bore 14. Disposed within the axial stepped bore 15 is a guide sleeve 16 which is retained in place by engagement with an internal annular shoulder of bore 15 to axially slidably support a snap portion of a drawing rod 17. A pusher rod 19 threaded into the snap portion of drawing rod 17 is arranged to push out a pull stud 18 of tool holder 12 and carries thereon a pair of grippers 20 which are arranged to clamp and pull the pull stud 18 of tool holder 12 when the drawing rod 17 is moved rearward and to release the pull stud 18 of tool holder 12 when the drawing rod 17 is moved forwards. Disposed between the rearward end of drawing rod 17 and the guide sleeve 16 is a set of washer springs 21 arranged to draw the drawing rod 17 in a rearward direction relative to the tool spindle 11. An unclamping device (not shown) is arranged at the rear side of tool spindle 11 to effect forward movement of the drawing rod 17 against the pulling force of washer springs 21. For example, the unclamping device is disclosed in U.S. Pat. No. 4,409,721 issued on Oct. 18, 1983.

Figure 2:
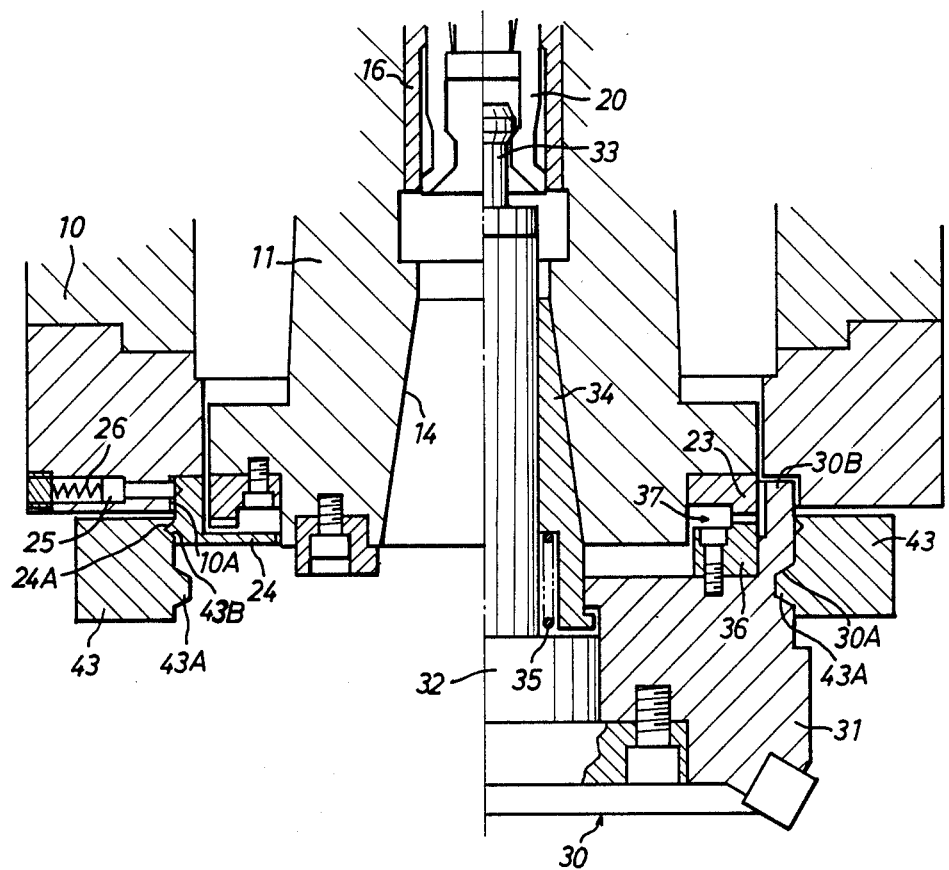
FIG. 2 is a sectional view of the spindle head in a condition where a tool holder of large diameter has been inserted by a tool change arm into the tool spindle after removal of a protection cover member from the spindle head.

A ring gear 23 is secured to the forward end of tool spindle 11 in a concentric relationship with the tool receiving tapered bore 14 for meshing engagement with a corresponding ring gear 36 secured to a tool holder 30 of large diameter as shown in FIG. 2. The spindle head 10 is formed at its forward end with an annular recess 10A in which an annular protection cover member 24 is removably disposed to contain the ring gear 23 therein. The protection cover member 24 is useful to protect the ring gear 23 from scraps of metal during operation of the tool spindle 11. As shown in FIG. 2, a plurality of circumferentially spaced radial pins 25 are retractably disposed in the forward end portion of spindle head 10 and are each radially inwardly loaded by a compression coil spring 26 to retain the protection cover member 24 in place by engagement with an annular v-grooved portion thereof.

As shown in FIG. 2, the tool holder 30 of large diameter has a central axis part 32 provided at its forward end with a tool body 31 such as a milling cutter and a pull stud 33 formed at the rear end of central axis part 32 to be clamped by the grippers 20 when inserted into the tool spindle 11. A tapered sleeve 34 is axially slidably coupled over the central axis part 32 of tool holder 30 and loaded in a rearward direction relative to the tool holder 30 by means of a compression coil spring 35 applied thereto. In a condition where the tapered sleeve 34 has been coupled within the tapered bore 14 of tool spindle 11, the coil spring 35 acts to effect resilient engagement of the pull stud 33 of tool holder 30 with the grippers 20.

The ring gear 36 is secured to a rear end surface of tool body 31 to be brought into meshing engagement with the ring gear 23 when the tool holder 30 has been supported in place by insertion into the tapered bore 14 of tool spindle 11. Thus, a gear coupling is composed of the pair of ring gears 23 and 36. The tool body 31 of holder 30 is integrally formed at its outer periphery with an annular protection cover part 30B which is coupled within the annular recess 10A of spindle head 10 with a slight clearance to protect the ring gears 23 and 36 from scraps of metal during rotation of the tool spindle 11.

Figure 3:
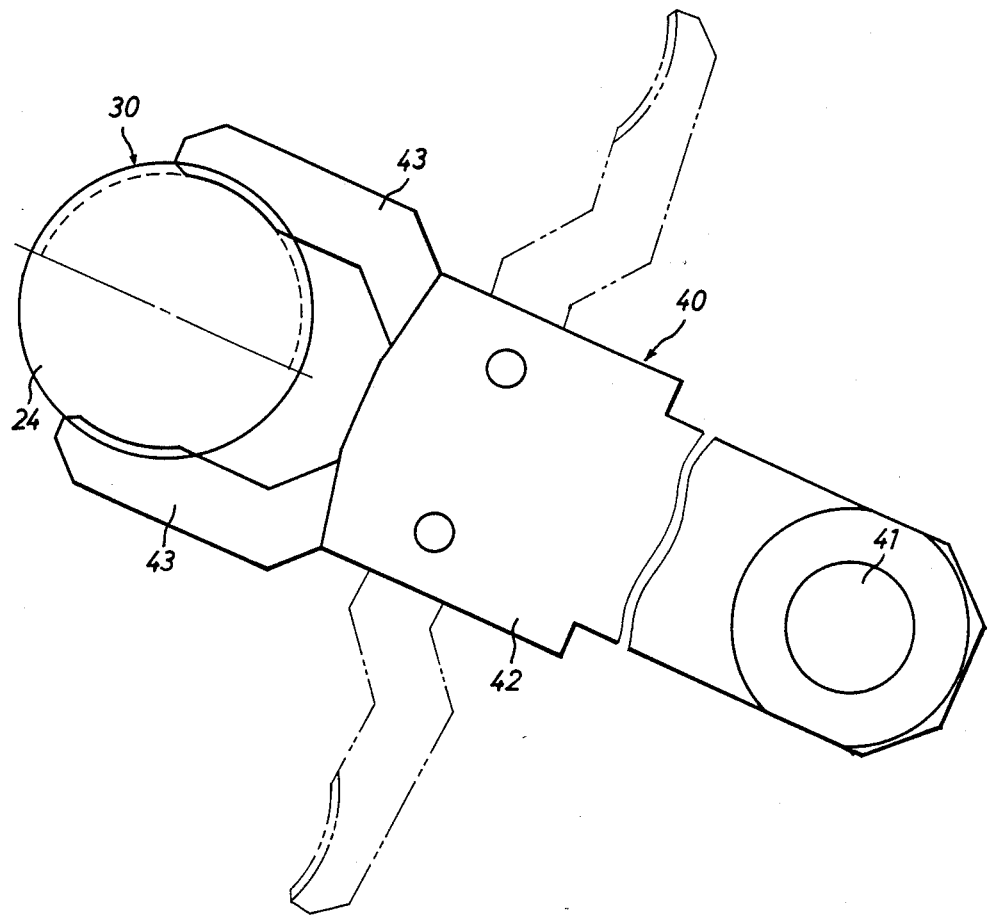
FIG. 3 is a schematic illustration of the tool change arm shown in FIG. 2.

In FIG. 3 there is illustrated a tool change arm 40 arranged to remove the protection cover member 24 from the spindle head 10 for replacement with the tool holder 30 of large diameter. The body 42 of tool change arm 40 is fixed to a support shaft 41 which is arranged in parallel with the axis of tool spindle 11. The support shaft 41 is axially slidably and rotatably carried by a support body (not shown) of the machine tool. The tool change arm 40 has a pair of tool grippers 43 pivoted to the arm body 42 to selectively grasp the protection cover member 24 or the tool holder 30 of large diameter in tool changing operation. As shown in FIG. 2, the tool grippers 43 each are formed at their grip surface with a semi-circular projector 43A engageable with an annular groove 30A in the outer periphery of tool holder 30 and a semi-circular groove 43B engageable with an annular projection 24A on the outer periphery of protection cover member 24. In addition, the support shaft 41 and tool grippers 43 are arranged to be operated by a drive mechanism (not shown) in such a manner as will be described hereinafter.

In a condition where the standard tool holder 13 is supported in place by insertion into the tool spindle 11 and clamped by the grippers 20, the protection cover member 24 is retained in place by engagement with the radial pins 25 loaded by the springs 26 to protect the ring gear 23 of tool spindle 11 in operation. When it is desired to remove the protection cover member 24 from the spindle head 10 for replacement with the tool holder 30 of large diameter, the standard tool holder 13 is removed from the tool spindle 11 in a conventional manner by means of a tool change arm (not shown). Thereafter, the support shaft 41 is operated to rotate the tool change arm 40 to an upper position where tool change operation is performed, and subsequently the tool grippers 43 are operated to clamp the protection cover member 24 at their semi-circular grooves 43B. In such a condition, the support shaft 41 is axially moved forwards to remove the protection cover member 24 clamped by grippers 43 from the spindle head 10 and is further operated to rotate the tool change arm 40 to a lower position where the tool grippers 43 are operated to release the protection cover member 24 and retain it on an appropriate support device (not shown). Thereafter, the support shaft 41 is operated to rotate the tool change arm 40 to a tool change position.

After removal of the protection cover member 24, the tool holder 30 of large diameter stored in a tool magazine (not shown) is indexed to the tool change position where the tool grippers 43 of tool change arm 40 is operated to clamp the tool holder 30 at their semi-circular projections 43A. Subsequently, the support shaft 41 is operated to rotate the tool change arm 40 to the upper position where the tool holder 30 clamped by grippers 43 is indexed to be inserted into the tapered bore 14 of tool spindle 11. When the support shaft 41 is moved rearwards to insert the tool holder 30 into the tapered bore 14 of tool spindle 11, the drawing rod 17 is retracted by the biasing force of washer springs 21 such that the grippers 20 act to clamp and draw the pull stud 33 of tool holder 30 and to bring the ring gear 36 of tool holder 30 into meshing engagement with the ring gear 23 of tool spindle 11. During the process of inserting the tool holder 30 into spindle 11, the tapered sleeve 34 is resiliently engaged with the tapered bore 14 of tool spindle 11 under the load of spring 35 to effect centering of the tool holder 30. Thus, the ring gears 23 and 36 are reliably meshed with each other, and the protection cover part 30B of tool holder 30 is smoothly coupled within the annular recess 10A of spindle head 10.

After machining operation by the tool holder 30, the tool change arm 40 is operated in a reverse manner to the foregoing process to remove the tool holder 30 from spindle 11 and return it to the tool magazine and to attach the protection cover member 24 to the spindle head 10.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims the invention may be practiced otherwise than as specifically set forth herein.

What is claimed is:

1. A machine tool comprising a spindle head mounted thereon and a tool spindle rotatably supported within said spindle head and being formed with a tapered bore for selectively supporting a standard tool holder or a second tool holder of large diameter inserted thereinto, a first ring gear secured to a forward end of said tool spindle in a concentric relationship with the tapered bore of said tool spindle; and a second ring gear secured to said second tool holder to be brought into meshing engagement with said first ring gear when said second tool holder has been inserted into the tapered bore of said tool spindle; said machine tool further comprising:
  a protection cover member to be coupled within a forward end of said spindle head in surrounding relationship with said first ring gear when said standard tool holder has been inserted into the tapered bore of said tool spindle, said cover member being formed to contain therein said first ring gear when it has been coupled within the forward end of said spindle head;

means for removably retaining said protection cover member in place when coupled within the forward end of said spindle head;

a protection cover part integrally formed with an outer periphery of said second tool holder in surrounding relationship with said second ring gear to be coupled within the forward end of said spindle head when said second tool holder has been inserted into the tapered bore of said tool spindle, said cover part being formed to contain therein said first and second ring gears meshed with each other when it has been coupled within the forward end of said spindle head; and a tool change mechanism including a tool change arm provided with a pair of tool grippers each having a first grip portion for engagement with said protection cover member and a second grip portion for engagement with said second tool holder, said tool change arm being arranged in such a manner that said tool grippers are operated to couple said protection cover member within the forward end of said spindle head and remove it therefrom for replacement with said second tool holder and to insert said second tool holder into the tapered bore of said tool spindle.

2. A machine tool as claimed in claim 1, wherein an annular recess is formed in the forward end of said spindle head, and wherein each outer periphery of said protection cover member and said protection cover part is formed annularly to be coupled within the annular recess of said spindle head.

3. A machine tool as claimed in claim 2, wherein an annular groove is formed on the outer periphery of said protection cover member, and wherein said means for retaining said protection cover member comprises a plurality of circumferentially spaced radial pins retractably disposed in the forward end portion of said spindle head for engagement with the annular groove of said protection cover member and a plurality of springs disposed in the forward end portion of said spindle head to bias said radial pins radially inwardly toward the annular groove of said protection cover member.

4. A machine tool as claimed in claim 1, wherein said second tool holder comprises a tapered sleeve axially slidably coupled over a central axis part thereof for engagement with the tapered bore of said tool spindle, and resilient means for biasing said tapered sleeve axially inwardly when it has been engaged with the tapered bore of said tool spindle.

* * * * *